United States Patent [19]

Anderson

[11] Patent Number: 4,695,078
[45] Date of Patent: Sep. 22, 1987

[54] SWIVEL PIPE JOINT

[75] Inventor: Robert W. Anderson, Stocksfield, England

[73] Assignee: Anson Limited, Gateshead, England

[21] Appl. No.: 901,751

[22] Filed: Aug. 28, 1986

[30] Foreign Application Priority Data

Sep. 5, 1985 [GB] United Kingdom ............... 8522047
Jan. 28, 1986 [GB] United Kingdom ............... 8601972

[51] Int. Cl.⁴ ............................................. F16L 17/00
[52] U.S. Cl. ..................................... 285/98; 285/280; 285/275; 285/351
[58] Field of Search ................. 285/98, 278, 275, 272, 285/280, 281, 351

[56] References Cited

U.S. PATENT DOCUMENTS 2,384,360  9/1945  Allen .................................. 285/98
2,481,404  9/1949  Donner ......................... 285/351 X
2,907,590 10/1959  Oswald .............................. 285/98

Primary Examiner—Richard J. Scanlan, Jr.
Attorney, Agent, or Firm—Abelman Frayne Rezac & Schwab

[57] ABSTRACT

A swivel joint for pipes includes a split collet carried by a male portion of the coupling, and which provides an abutment for a threaded annular nut carried by a female member of the coupling, the nut being lockable in its adjusted position, the male member being rotatable within the female member to provide for swivelling of the joint.

7 Claims, 7 Drawing Figures

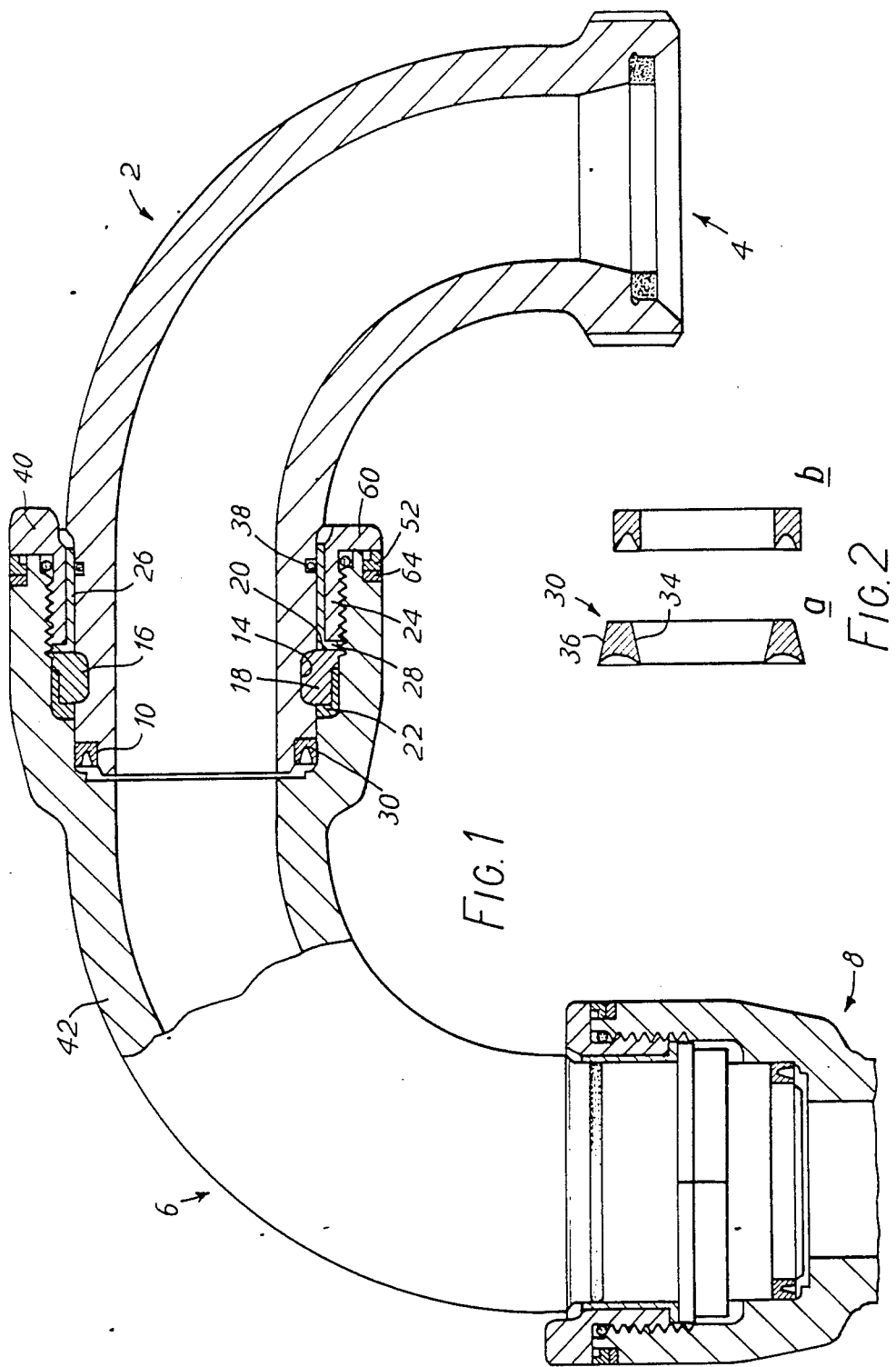

SWIVEL PIPE JOINT

BACKGROUND OF THE INVENTION

This invention relates to pipe joints and more particularly to swivel joints between adjacent lengths of pipe which are interconnected to form a pipeline for carrying fluids, for example for conveying fluids at high pressure in oil exploration and related industries.

Oil pipelines associated with exploration drilling rigs commonly comprise a series of interconnected lengths of steel pipe each of which includes a male connecting piece at one end and a female connecting piece at the other end. The inlets and outlets to be connected by such pipelines can be at various positions relative to one another and it is not always possible or practical to provide rigid pipelines particularly suited to all applications.

Consequently, it has become established practice to provide pipelines comprising lengths of pipe of various configurations, including linear and elbow-shaped lengths, which are interconnected with one another by means of swivel joints whereby relative axial rotation of adjacent lengths of pipe can occur. Thus, one or more swivel joints, together with appropriately-shaped lengths of pipe, can be incorporated in a pipeline to enable connection between points at differing heights and angles.

Swivel joints between adjacent lengths of pipe commonly incorporate a series of circumferential tracks or raceways within the male and female connecting pieces which house ball bearings as the bearing thrust medium. Sealing of the two pipe lengths relative to one another is achieved by means of annular sealing rings axially compressed between adjacent internal, radially extending faces of the male and female connecting pieces.

Such arrangements have a number of disadvantages. The pipelines in question, once they have adopted a desired configuration between two points to be interconnected, remain substantially in that position. Thus, the swivel joints eventually adopt a substantially stationary position, and it is not good engineering practice to use ball bearings for stationary, high load thrust situations. The bearings, as well as the tracks, can become dented and distorted, while such swivel joints are difficult to repair due to ball bearings having to be extracted and re-inserted through small apertures in the connecting pieces.

Further, and perhaps of even more importance, the seals associated with such swivel joints are very prone to failure. As the thrust bearing wears, the degree of axial compression on the annular sealing rings can decrease until leakage can occur, often with catastrophic results.

SUMMARY OF THE INVENTION

It is an object of the invention to provide a swivel joint between two lengths of pipe that overcomes the above-mentioned problems of existing arrangements and which can be readily assembled and disassembled.

According to the present invention there is provided a swivel joint between two lengths of pipe, the joint comprising a male connecting piece on the end of one length of pipe and a corresponding female connecting piece on the end of the other length of pipe, the male connecting piece having a circumferential groove formed in the outer wall thereof in which is located a substantially annular split collet the axially inner wall of which projects radially outwardly of the outer surface of the male connecting piece to provide an abutment surface, and an externally threaded nut mounted on, to surround the male connecting piece and having a front face adapted to react against said abutment surface of the split collet, the internal surface of the female connecting piece having a screw thread formed therein corresponding with the external thread on said nut and being recessed to receive therein, in bearing engagement, said split collet on the male connecting piece, the joint further comprising at least one substantially annular seal reacting between opposed, radially spaced surfaces of the male and female connecting pieces such that, on location of the male connecting piece within the female connecting piece and on screwing of the nut on the male connecting piece into the female connecting piece, a radial seal is effected between the two connecting pieces, which pieces can swivel relative to one another about the central longitudinal axis of the joint.

In a preferred joint, a cylindrical bearing member is provided as a force fit between the male connecting piece and the externally threaded nut, said bearing member including an annular flange extending radially of the joint and positioned between the front face of the nut and the abutment surface of the split collet.

Conveniently, the joint further comprises a substantially annular bearing member surrounding the split collet and having a bearing surface adapted to make bearing contact with said recess in the internal surface of the female connecting piece.

It has been found that, in certain practical situations, the externally threaded nut on the male connecting piece which is screwed into the female connecting piece to effect the seal between the two connecting pieces can gradually work loose. Although this does not result in any immediate leakage at the joint because of the radial nature of the seal or seals, it would be desirable to reduce or eliminate the possibility of said nut working loose.

Accordingly, a preferred swivel joint comprises releasable locking means reacting between the female connecting piece and the nut on the male connecting piece such that, subsequent to screwing of the nut into the female connecting piece, said locking means can be engaged with the nut to prevent any rotation thereof.

Conveniently the locking means comprises a substantially annular locking ring mounted on the female connecting piece to be movable axially therealong but rotatably fixed relative thereto, said locking ring including a front annular, radially extending surface adapted for abutment with an annular, radially extending surface on the nut, and releasable means for retaining said surfaces on the locking ring and nut in engagement one with the other whereby said surfaces co-operate to prevent relative rotation therebetween.

Preferably said annular, radially extending surfaces on the locking ring and on the nut are each provided with serrations adapted to interlock with each other, while the means for retaining the serrated surfaces in engagement with one another may comprise a retaining ring or circlip reacting between a radially extending shoulder on the female connecting piece and the rear, annular, radially extending surface of the locking ring, said circlip being releasable from said retaining position.

Conveniently the locking ring is mounted on the end region of the female connecting piece, said end region being of reduced external diameter to define said radially extending shoulder thereon, said end region of the female connecting piece being formed with a plurality of flats thereon, and the bore of the locking ring being formed with a corresponding plurality of flats therein whereby the locking ring is axially movable along the end region of the female connecting piece but is rotatably fixed relative thereto.

BRIEF DESCRIPTION OF THE DRAWINGS

FIG. 1 is a longitudinal section through joints according to the invention;

FIGS. 2a and 2b show a seal of FIG. 1 in more detail in its natural condition and its operative, radially-compressed condition respectively;

DESCRIPTION OF THE PREFERRED EMBODIMENT

Figure 3:
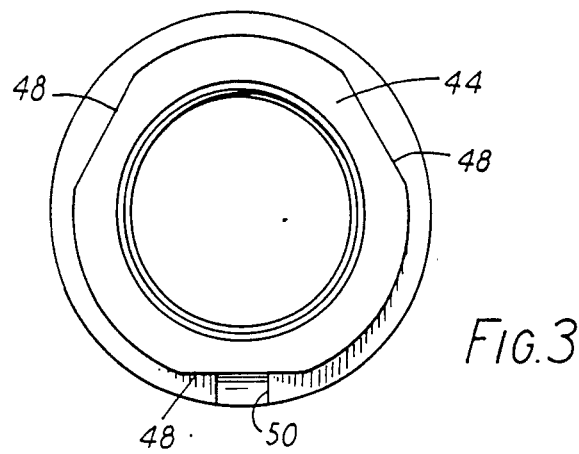
FIG. 3 is an end view of the female connecting piece of a joint of FIG. 1.
Figure 4:
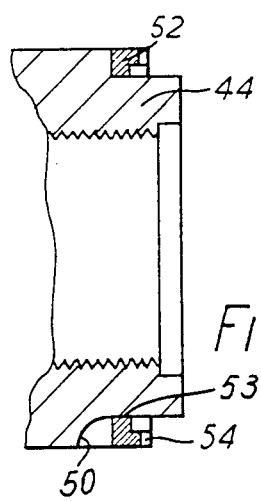
FIGS. 4 to 7 are longitudinal sections through the female connecting piece, locking means and nut showing the sequence of assembly of the locking means onto the joint.
Figure 5:
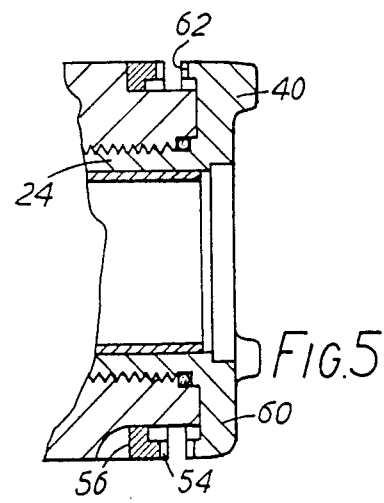

Referring to FIGS. 1 and 2 of the drawings, there is shown a pipeline assembly including two swivel joints according to the invention, the assembly being of substantially U-shape and comprising a first elbow pipe 2 having a conventional female connecting piece indicated generally at 4 at one end, the other end forming part of a first swivel joint, a second elbow pipe 6 having female and male connecting piecs at its ends forming parts of the first and a second swivel joint respectively, and an end pipe 8 one end of which completes the second swivel joint and the other end of which (not shown) comprises a conventional male connecting piece.

The swivel joint between the elbow pipes 2 and 6 will now be detailed, although that between the pipes 6 and 8 is identical.

The male connecting piece of the pipe 2 has, at its free end, a reduced diameter shoulder 10 formed therearound adapted to receive thereon a substantially annular seal as will be described in more detail below. Axially inwardly of said shoulder 10 there is formed a circumferential groove 14 of generally U-shape in transverse section in which are received the two semi-circular portions 16,18 of a split collet the rear surface of which extends radially outwardly of the outer wall of the male connecting piece to form an abutment surface 20.

An annular bearing member or shell 22, which is a close tight fit over the front regions of the split collet, is provided to retain said collet in position on the male connecting piece, said bearing member 22 having an outer bearing surface thereto.

Rearwardly of the split collet, an annular, externally-threaded nut 24 surrounds the male connecting piece, a cylindrical bearing member 26 being a close fit between the inner surface of the nut 24 and the outer surface of the male connecting piece of the pipe 2. The bearing member 26 includes an annular flange 28 at its forward end and projecting radially of the male connecting piece to be located between the abutment surface 20 of the split collet and the forward end of the nut 24.

The end extent of the female connecting piece of the pipe 6 has an internal screw-thread formed therein corresponding with the external thread on the nut 24, while the internal surface of the female connecting piece is shaped to provide a bearing surface adapted to receive therein the bearing member 22 of the male connecting piece and to provide an annular recess to receive therein a seal 30 the normal configuration of which is shown in FIG. 2a, said seal having tapering radially inner and radially outer surfaces 34,36 defining radially inner and radially outer lips thereto.

Assembly of the described swivel joint is achieved as follows.

After location of an 0-ring seal 38 in a corresponding groove in the male connecting piece, the nut 24 is positioned on said connecting piece. The cylindrical bearing member 26 is force-fitted between the nut 26 and the connecting piece with the flange 28 abutting the front end of the nut 26, and the two halves 16,18 of the split collet are located in the groove 14. The split collet is retained in position on the male connecting piece by positioning the bearing member or shell 22 over the portions 16,18 whereby the assembly on the male connecting piece is completed.

The female connecting piece is prepared for assembly by inserting the seal 30 into the receiving recess in the internal surface thereof.

The joint is then completed by locating the male connecting piece into the female connecting piece and tightening the nut 24 into the threaded end extent of the female connecting piece. Tightening of the nut 24 is facilitated by the provision of radially-projecting circumferentially-spaced lugs 40 on the outer surface of the nut to which tangential forces can be applied.

Once the nut is fully tightened, the position illustrated in FIG. 1 is achieved, the clearances being such as to take up all axial movement between the two connecting pieces whilst at the same time ensuring an effective seal between the two connecting pieces and permitting relative swivelling about the central longitudinal axis of the joint.

More particularly, in the assembled condition of the joint, the seal 30 is radially compressed whereby the surfaces 34,36 thereof seal against the opposed, radially-spaced surfaces on the male and female connecting pieces respectively—the configuration of the seal is then as shown in FIG. 2b.

Bearing surfaces of substantial axial extent are provided between the bearing member or shell 22 and the correspondingly-shaped inner surface of the female connecting piece and between the inner surface of the cylindrical bearing member 26 and the outer surface of the male connecting piece. Thus the area of bearing contact between the two movable components is substantial and whereby the joint can withstand substantial nonaxial forces applied thereto without any distortion of the components thereof. Further, the seal 30, being radially compressed, will maintain an effective seal between the two connecting pieces even on wear of the bearing members such as permits relative axial movement therebetween.

The described joints are particularly suited to pipelines carrying oil or similar fluids at high pressures up to of the order of 20,000 p.s.i. In order to prevent undesirable wear of the internal wall of an elbow pipe, the thickness of the outer wall of such an elbow may be increased, as at 42, compared with the thickness of the rest of the wall.

It will be appreciated that the described joint can be readily assembled and disassembled, the provision of the bearing member or shell 22 being particularly useful in maintaining the components of the male connecting piece in an operative condition.

The provision of a nut 24 located inwardly of the joint substantially eliminates the possibility of inadvertent loosening of the joint, as can occur with joints incorporating external nuts which can be subjected to undesirable loosening forces.

However, it may still be desirable to incorporate releasable locking means on the joint to ensure that the nut 24 is retained in its operative locking position even under extremely adverse conditions. The joint of FIG. 1 incorporates such releasable locking means which are shown in more detail in FIGS. 3 to 7.

Referring more particularly to FIGS. 3 to 7, the female connecting piece includes a reduced diameter end region 44 determined by a radially-extending shoulder 46, the end region 44 having three equally spaced, axially extending flats 48 formed therealong as clearly seen in FIG. 3. A slot 50 extending slightly axially rearwardly of the shoulder 46 is formed in the lower regions of the female connecting piece for reasons to be described below.

The locking means comprises a substantially annular locking ring 52 the bore through which conforms with the configuration of the surface of the end region 44 of the female connecting piece, in that it includes three flats 53 therein positioned to correspond with the flats 48 and whereby the ring 52 can be moved axially along the end region 44 but cannot rotate thereon. The locking ring includes front and rear surfaces 54,56 respectively, the front surface 54 being provided with a plurality of serrations therearound for reasons which will become apparent.

The annular, externally threaded nut 24 on the male connecting piece includes an outer end region 60 on which the radially-projecting circumferentially-spaced lugs 40 are formed and which includes a front surface 62 adapted to abut the surface 54 of the locking ring 52, said surface 62 also being provided with a plurality of serrations therearound.

The described arrangement operates as follows. With the locking ring 52 positioned on the end region 44 of the female connecting piece to abut the shoulder 46, as in FIG. 4, the nut 24 is fully tightened to effect the sealed joint between the male and female connecting piece as described above with reference to FIGS. 1 and 2.

In this position of the nut 24, which is determined by abutment of the inner face of the end region 60 of the nut with the end of the end region 44 of the female connecting piece (FIG. 5), a gap is defined between the surface 54 of the locking ring 52 and the surface 62 of the nut 24.

Figure 6:
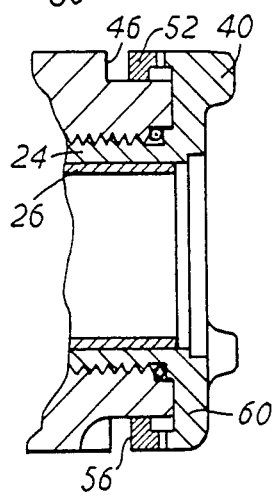

The locking ring 52 is moved axially along the end region of the female connecting piece to bring the serrations on the surfaces 54 and 62 into mating engagement, a gap then existing between the surface 56 of the ring 52 and the shoulder 46 (FIG. 6).

Figure 7:
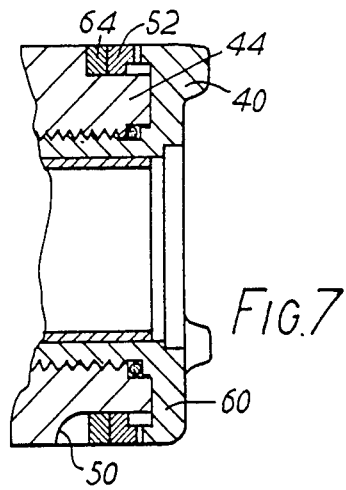

The locking means further comprises a part-circular, resilient retaining ring or circlip 64 the natural diameter of which is substantially equal to that of the reduced-diameter end region 44 of the female connecting piece, while the width of the circlip 64 is equal to the width of the gap between the surface 56 and the shoulder 46. The circlip 64 is then sprung loaded into the gap, as shown in FIG. 7, to retain the serrations in said mating engagement and therefore to prevent any undesirable rotation of the nut from its fully tightened position.

The pitch of the serrations on the surfaces 54 and 62, as well as the permitted play of the ring 52 on the end region 44 of the female connecting piece, are chosen to ensure that, regardless of the final position of the nut 24, mating engagement of the serrations is ensured.

When the joint is to be disconnected, the circlip 64 is first of all removed from its position in the gap between the shoulder 46 and the ring 52 utilising the slot 50 to lever the circlip out of said gap. The ring 52 is then slid out of engagement with the nut 24 whereby said nut can be unscrewed from within the female connecting piece.

Thus the releasable locking means serve to prevent inadvertent or undesirable rotation of the nut 24, said means reacting between the female connecting piece and the nut itself. Clearly the particular configuration of the locking means may vary from that shown and in particular the co-operating means on the surfaces 54 and 62 may be other than serrations. Such modifications and variations from the described and illustrated arrangement will be apparent to those skilled in the art.

What I claim and desired to secure by Letters Patent is:

1. A swivel joint between two lengths of pipe, said joint including a male connecting piece on an end of one length of pipe, and a cooperating female connecting piece on an end of the other length of pipe;

said male connecting piece having an axially directed cylindrical outer wall and a circumferential groove formed in said outer wall and positioned spaced from the axial end of said male connecting piece, a substantially annular split collet located within said groove and having an axially inner radial wall projecting outwardly from said outer wall to provide an abutment surface, and having an externally threaded nut rotatably mounted on said male connecting piece, said nut having an axially outer radial face adapted to react against said abutment surface of said split collet;

said female connecting piece having a cylindrical internal surface in which said axial end of said male member is received and positionally supported for swivelling movement of said male and female members relative to each other, a screw thread formed in said internal surface and corresponding with the external thread of said nut, said internal surface being recessed to receive said split collet on said male connecting piece in bearing engagement therewith;

said male and female connecting pieces having opposed, radially spaced and axially directed surfaces thereon between which at least one substantially annular seal reacts;

whereby, on location of the male connecting piece within the female connecting piece, and, upon threading of the nut on the male connecting piece into the female connecting piece, a radial seal is effected between the two connecting pieces, and, said pieces can swivel relative to each other about the central longitudinal axis of the joint; and a cylindrical bearing member which is a force fit on said male connecting piece, said bearing member including an annular flange extending radially of said male connecting piece and positioned between said axially outer radial face of the nut and said abutment surface of said split collet.

2. A swivel joint as claimed in claim 1 and comprising a substantially annular bearing member surrounding said split collet and having a bearing surface adapted to make bearing contact with said recess in the internal surface of said female connecting piece.

3. A swivel joint as claimed in claim 1 and comprising releasable locking means reacting between said female connecting piece and said nut on the male connecting piece such that, subsequent to screwing of said nut into said female connecting piece, said locking means can be engaged with said nut to prevent any rotation of said nut.

4. A swivel joint as claimed in claim 3 in which the locking means comprises a substantially annular locking ring mounted on said female connecting piece to be movable axially therealong but rotatably fixed relative thereto, said locking ring including a front, annular, radially extending surface having locking members, and said nut including an annular, radially extending surface thereon having complimentary locking member against which said front surface of said locking ring is adapted to abut, and releasable means for retaining said locking members on said locking ring and nut in engagement one with the other, whereby said locking members cooperate to prevent relative rotation therebetween.

5. A swivel joint as claimed in claim 4 and including serrations formed on said radially extending surfaces on said locking ring and on said nut and providing said locking members, said serrations being adapted to interlock with each other to prevent said relative rotation between said locking ring and said nut.

6. A swivel joints claimed in claim 5 in which a radially extending shoulder is formed on said female connecting piece, said means for retaining said serrated surfaces in engagement with one another comprising a circlip reacting between said radially extending shoulder on the female connecting piece and the rear, annular, radially extending surface of the locking ring, said circlip being releasble from said retaining position.

7. A swivel joint as claimed in claim 6 in which said female connecting piece includes an end region, the locking ring being mounted on said end region of the female connecting piece, said end region being of reduced external diameter to define said radially extending shoulder thereon, a plurality of flats being formed on said end region of the female connecting piece, and a corresponding plurality of flats being formed in the bore of said locking ring, whereby the locking ring is axially movable along the end region of the female connecting piece but is fixed rotationally relative thereto.

* * * * *